(12) United States Patent
Watanabe et al.

(10) Patent No.: US 10,003,233 B2
(45) Date of Patent: Jun. 19, 2018

(54) MECHANICALLY AND ELECTRICALLY INTEGRATED ROTARY ELECTRIC MACHINE

(71) Applicant: MITSUBISHI ELECTRIC CORPORATION, Chiyoda-ku (JP)

(72) Inventors: Norihiro Watanabe, Chiyoda-ku (JP);
Yoshihiro Miyama, Chiyoda-ku (JP);
Hideaki Arita, Chiyoda-ku (JP);
Akihiro Daikoku, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 259 days.

(21) Appl. No.: 15/035,142

(22) PCT Filed: Jun. 9, 2014

(86) PCT No.: PCT/JP2014/065252
§ 371 (c)(1),
(2) Date: May 6, 2016

(87) PCT Pub. No.: WO2015/087567
PCT Pub. Date: Jun. 18, 2015

(65) Prior Publication Data
US 2016/0285335 A1    Sep. 29, 2016

(30) Foreign Application Priority Data
Dec. 13, 2013 (JP) .................................. 2013-257789

(51) Int. Cl.
*H02K 11/00* (2016.01)
*H02K 3/28* (2006.01)
(Continued)

(52) U.S. Cl.
CPC ............... *H02K 3/28* (2013.01); *H02K 3/522* (2013.01); *H02K 5/20* (2013.01); *H02K 9/19* (2013.01);
(Continued)

(58) Field of Classification Search
CPC ...... H02K 3/28; H02K 11/33; H02K 15/0068; H02K 2203/09
(Continued)

(56) References Cited

U.S. PATENT DOCUMENTS 8,299,664 B2 * 10/2012 Iwai ..................... H01L 23/3107
310/64
8,957,557 B2 *  2/2015 Yamasaki ............ B62D 5/0406
310/68 D
(Continued)

FOREIGN PATENT DOCUMENTS

JP   61-169470 U   10/1986
JP   62-159167 U   10/1987
(Continued)

OTHER PUBLICATIONS

International Search Report dated Aug. 19, 2014 for PCT/JP2014/065252 filed on Jun. 9, 2014.

*Primary Examiner* — Hanh Nguyen
(74) *Attorney, Agent, or Firm* — Oblon, McClelland, Maier & Neustadt, L.L.P.

(57) ABSTRACT

In a mechanically and electrically integrated rotary electric machine, a motor portion and an inverter portion are inserted inside a cylindrical frame. The motor portion has a plurality of coils. The inverter portion has a plurality of switching elements. The coils and the switching elements are electrically connected by a connector. The connector has: an end portion connector that distributes sinusoidal electric currents from the switching elements to the respective coils; and a
(Continued)

plurality of axial connectors that direct the sinusoidal electric currents from the switching elements to the end portion connector. The end portion connector is disposed on an end portion of the motor portion near an output shaft. The axial connectors are disposed parallel to an axial direction of the frame so as to pass from the switching elements through a mounted region of the motor portion.

14 Claims, 9 Drawing Sheets

(51) Int. Cl.
  *H02K 3/52* (2006.01)
  *H02K 11/33* (2016.01)
  *H02K 15/00* (2006.01)
  *H02K 9/19* (2006.01)
  *H02K 5/20* (2006.01)

(52) U.S. Cl.
  CPC ......... *H02K 11/33* (2016.01); *H02K 15/0068* (2013.01); *H02K 2203/09* (2013.01)

(58) Field of Classification Search
  USPC .................................................. 310/71, 68 D
  See application file for complete search history.

(56) References Cited

U.S. PATENT DOCUMENTS

| | | | |
|---|---|---|---|
| 2010/0327679 A1* | 12/2010 | Fujita | B62D 5/0406 310/71 |
| 2010/0328901 A1 | 12/2010 | Minato et al. | |
| 2011/0020153 A1 | 1/2011 | Murakami | |
| 2011/0175470 A1* | 7/2011 | Kinoshita | F04B 35/04 310/71 |
| 2012/0104886 A1* | 5/2012 | Yamasaki | B62D 5/0406 310/71 |
| 2013/0099610 A1* | 4/2013 | Suga | H02K 3/50 310/71 |
| 2014/0084722 A1 | 3/2014 | Minato et al. | |
| 2014/0175921 A1* | 6/2014 | Tomita | H02K 3/50 310/71 |
| 2014/0375157 A1* | 12/2014 | Taguchi | F04B 35/04 310/71 |

FOREIGN PATENT DOCUMENTS

| | | |
|---|---|---|
| JP | 11-234948 A | 8/1999 |
| JP | 2000-287403 A | 10/2000 |
| JP | 2002-218691 A | 8/2002 |
| JP | 2010-59809 A | 3/2010 |
| JP | 2010-279127 A | 12/2010 |
| JP | 2011-30408 A | 2/2011 |
| JP | 2011-176999 A | 9/2011 |
| JP | 2013-011197 A | 1/2013 |
| JP | 5259884 B1 | 5/2013 |

* cited by examiner

MECHANICALLY AND ELECTRICALLY INTEGRATED ROTARY ELECTRIC MACHINE

TECHNICAL FIELD

The present invention relates to a mechanically and electrically integrated rotary electric machine such as a rotary electric machine for driving an electric vehicle, or a rotary electric machine for driving a hybrid vehicle that includes a motor and an engine, for example, in which a motor portion and an inverter portion are disposed integrally, and particularly relates to a connecting construction therefor.

BACKGROUND ART

In conventional mechanically and electrically integrated rotary electric machines, a plurality of connectors of a motor portion are extended from the motor portion to an end surface of an inverter frame in an axial direction of a motor, and are soldered directly to a circuit board (see Patent Literature 1, for example).

CITATION LIST

Patent Literature

[Patent Literature 1]
Japanese Patent Laid-Open No. 2011-176999 (Gazette, Page 9, Lines 22 through 30, and FIG. 6)

SUMMARY OF THE INVENTION

Problem to be Solved by the Invention

The conventional mechanically and electrically integrated rotary electric machines that is disclosed in Patent Literature 1 is proposed for application to an electric power steering system. However, if a mechanically and electrically integrated rotary electric machine of this kind is applied to electric vehicle driving or hybrid vehicle driving, then it is necessary to use copper busbars that have large cross-sectional areas (approximately 1 mm×5 mm, for example) in alternating-current (AC) wiring between the motor portion and the inverter portion. In order to pass larger electric currents, it is expected that a cover for insulation would be required around the busbars, further increasing cross-sectional area.

Because of that, disposing the busbars so as to pass through a region in which the inverter portion is mounted to the housing end portion as it was in Patent Literature 1 leads to increases in overall size of the rotary electric machine. Furthermore, because it is necessary to pass a plurality of wires simultaneously through a penetrating aperture portion of the circuit board when connecting the AC wiring to the circuit board, ease of assembly is reduced.

The present invention aims to solve the above problems and an object of the present invention is to provide a mechanically and electrically integrated rotary electric machine that can use alternating-current (AC) wiring that has a large cross-sectional area that can accommodate high output while suppressing overall size increases, and that can also improve ease of assembly.

Means for Solving the Problem

A mechanically and electrically integrated rotary electric machine according to the present invention includes: a cylindrical frame; a motor portion including: a cylindrical stator core; a plurality of coils that are disposed around an inner circumference of the stator core; and a rotor that is rotatably disposed inside the stator core, the motor portion being inserted inside the frame; an inverter portion including a plurality of switching elements, the inverter portion being inserted inside the frame; and a connector that electrically connects the coils and the switching elements, wherein the connector includes: an end portion connector that is disposed on an end portion of the motor portion near an output shaft, and that distributes sinusoidal electric currents from the switching elements to each of the coils; and a plurality of axial connectors that are disposed so as to pass from the switching elements through a mounted region of the motor portion parallel to an axial direction of the frame, the axial connectors directing the sinusoidal electric currents from the switching elements to the end portion connector.

Effects of the Invention

In a mechanically and electrically integrated rotary electric machine according to the present invention, because the end portion connector that distributes the sinusoidal electric currents to each of the coils is disposed on the end portion of the motor portion 1 near the output shaft, and the axial connectors that direct the sinusoidal electric currents from the switching elements to the end portion connector are disposed so as to pass from the switching elements through the mounted region of the motor portion parallel to the axial direction of the cylindrical frame, the axial connectors can be efficiently disposed using the mounted region of the motor portion without reducing the mounted volume of the inverter portion, enabling alternating-current wires that have large cross-sectional areas that can accommodate high output to be used while suppressing overall size increases, and connection between the axial connectors and the end portion connector can be performed separately in a shallow portion of the frame, enabling ease of assembly to be improved.

DESCRIPTION OF EMBODIMENTS

Preferred embodiments of the present invention will now be explained with reference to the drawings.

Embodiment 1

Figure 1:
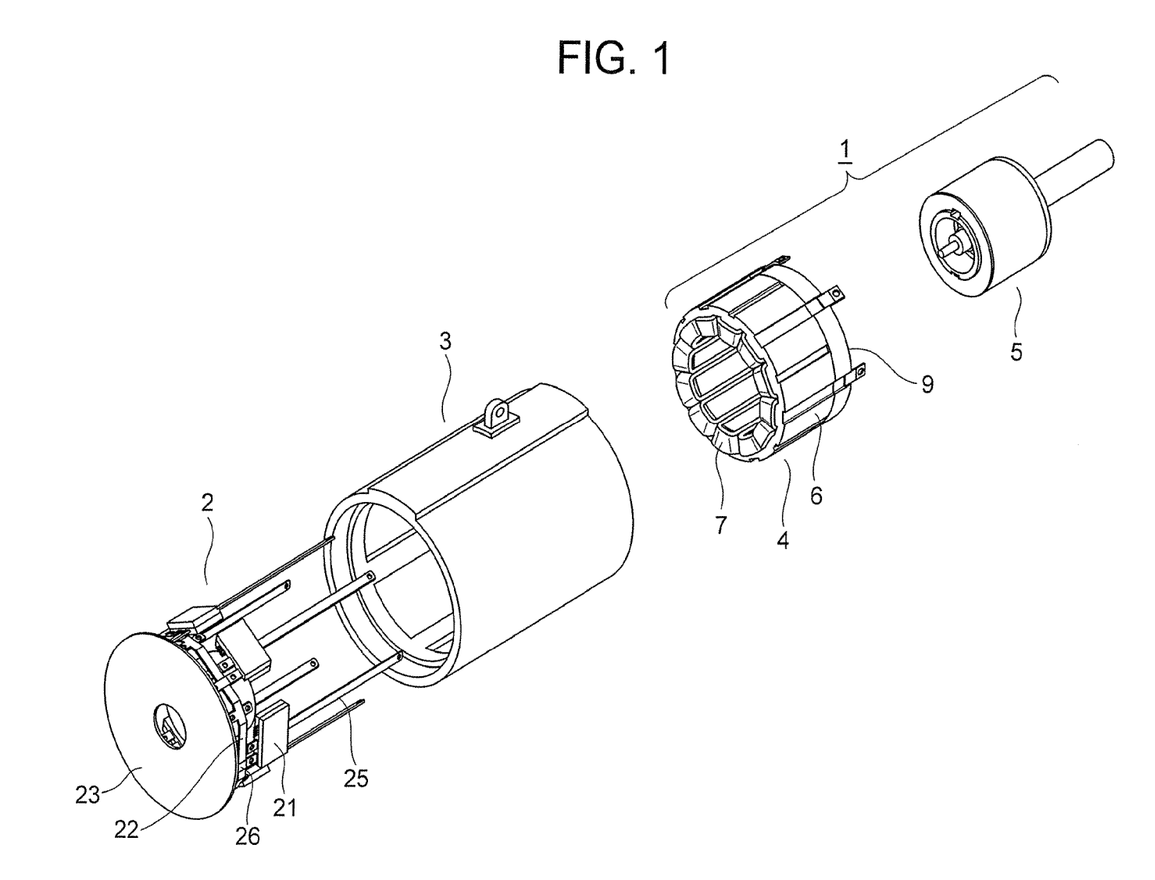
FIG. 1 is an exploded oblique projection that shows a mechanically and electrically integrated rotary electric machine according to Embodiment 1 of the present invention.

FIG. 1 is an exploded oblique projection that shows a mechanically and electrically integrated rotary electric machine according to Embodiment 1 of the present invention, and shows a rotary electric machine for electric vehicle driving or for hybrid vehicle driving. In the figure, the mechanically and electrically integrated rotary electric machine has a motor portion 1, an inverter portion 2, and a cylindrical frame 3.

The motor portion 1 is inserted inside the cylindrical frame 3 from a first axial end portion (right end portion in the figure) of the cylindrical frame 3. The inverter portion 2 is inserted inside the cylindrical frame 3 from a second axial end portion (left end portion in the figure) of the cylindrical frame 3. The motor portion 1 and the inverter portion 2 are thereby housed inside the cylindrical frame 3 so as to be arranged neatly in an axial direction of the cylindrical frame 3.

The motor portion 1 has: a cylindrical stator 4; and a rotor 5 that is rotatably disposed inside the stator 4. An outer circumferential surface of the rotor 5 faces an inner circumferential surface of the stator 4.

Figure 2:
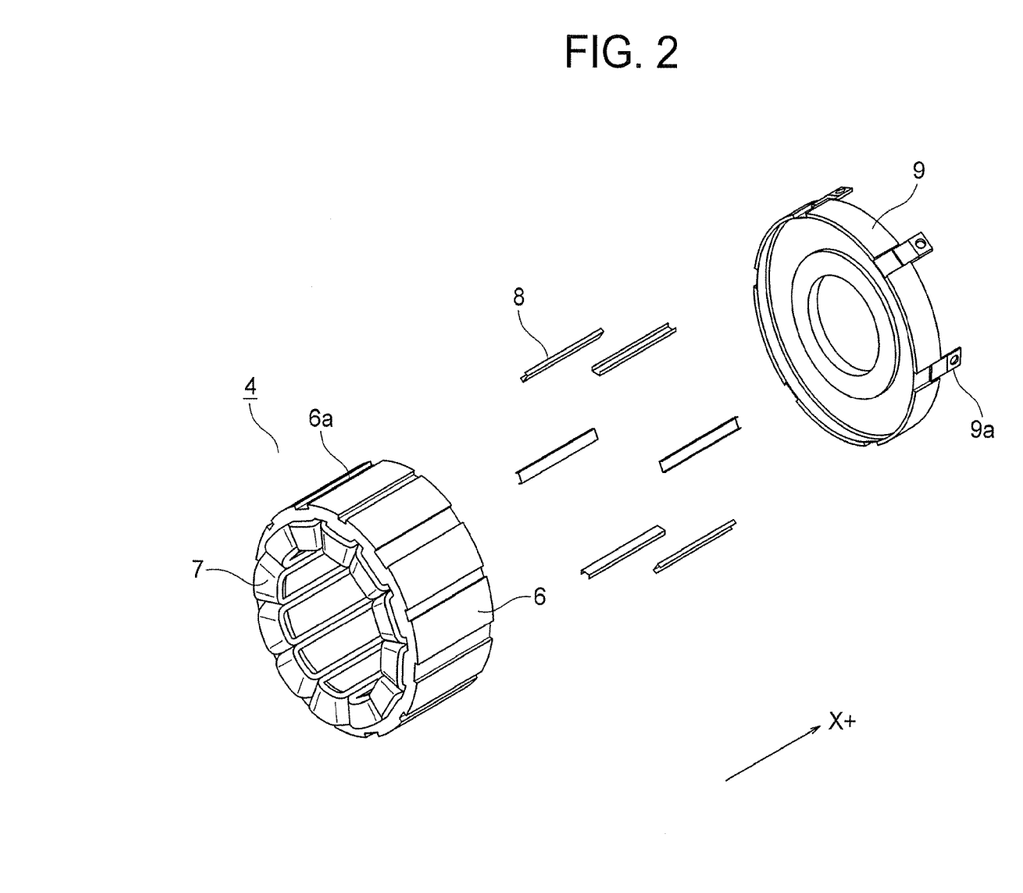
FIG. 2 is an exploded oblique projection that shows a stator from FIG. 1.

FIG. 2 is an exploded oblique projection that shows the stator 4 from FIG. 1. The stator 4 has: a cylindrical stator core 6; and a plurality of coils 7 that are disposed around an inner circumference of the stator core 6. A plurality of tooth portions that protrude radially inward are disposed around the inner circumference of the stator core 6. These tooth portions are disposed so as to be uniformly spaced apart from each other in a circumferential direction of the stator core 6. Slot portions are respectively formed between the adjacent tooth portions. Each of the coils 7 is wound around an outer circumference of a corresponding tooth portion.

A plurality of rectilinear stator grooves 6a are disposed around an outer circumference of the stator core 6. The stator grooves 6a are disposed so as to be spaced apart from each other circumferentially around the stator core 6. The stator grooves 6a are disposed parallel to an axial direction of the stator core 6 so as to be continuous over the entire axial direction of the stator core 6. In addition, the stator grooves 6a are disposed at positions that face the tooth portions, i.e., at positions in a circumferential direction of the stator core 6 that are identical to those of the tooth portions.

Six conduit members 8 that have an open box-shaped cross section are mounted around the outer circumference of the stator core 6. Each of the conduit members 8 is made of an insulating material such as a plastic, etc., and is inserted into a corresponding stator groove 6a.

A hollow discoidal end portion connecting member 9 that functions as an end portion connector (a second connector) is disposed on an end portion at an opposite axial end of the stator core 6 from the inverter portion 2, i.e., on an end portion of the motor portion 1 near an output shaft (X+ end in the figure). The end portion connecting member 9 performs predetermined connections among the respective coils 7, and also performs connection to the inverter portion 2.

Figure 3:
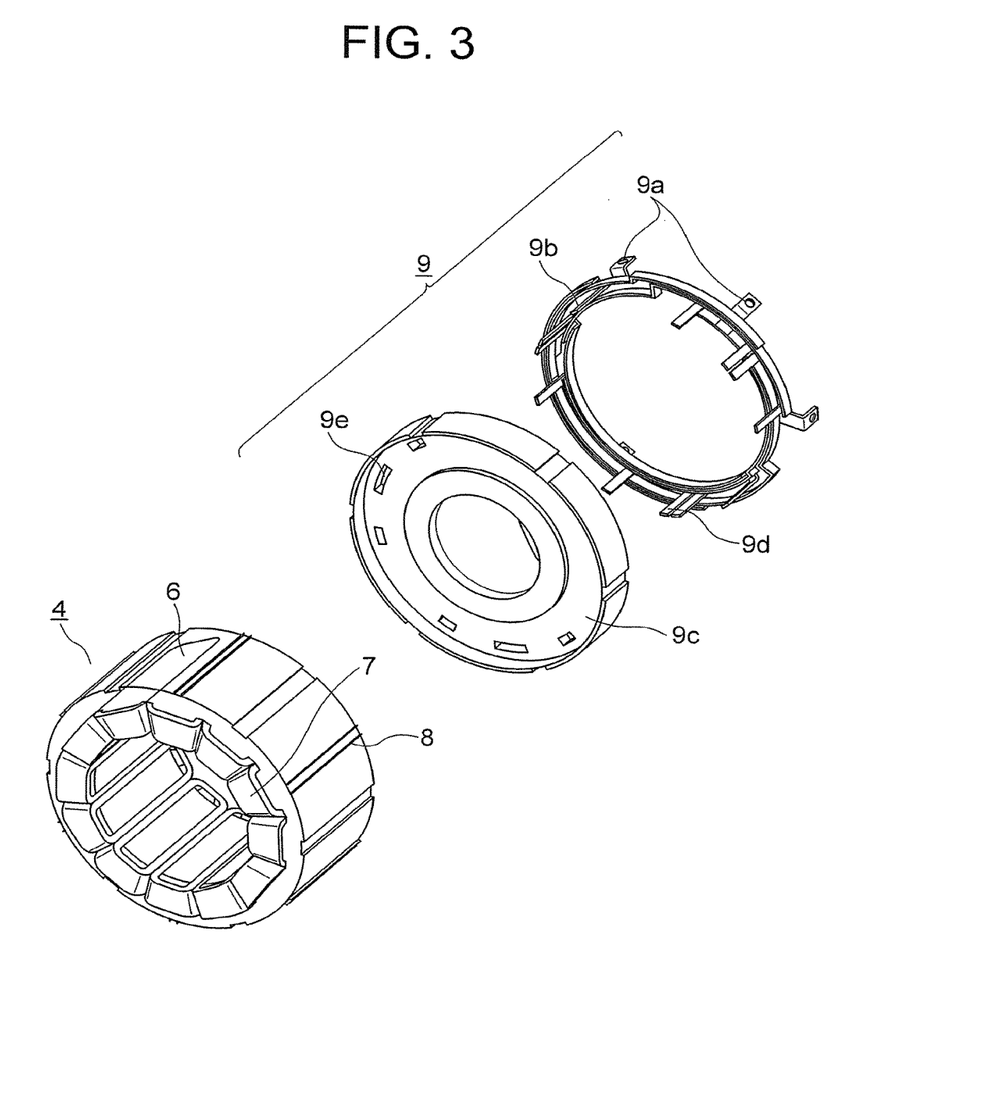
FIG. 3 is an exploded oblique projection that shows an end portion connecting member from FIG. 2 further exploded.

FIG. 3 is an exploded oblique projection that shows the end portion connecting member 9 from FIG. 2 further exploded. The end portion connecting member 9 is configured by combining: a plurality of (in this example, six) connecting conductors 9b that perform connection between the respective coils 7 and the inverter portion 2; and a connecting conductor supporting holder 9c that holds the connecting conductors 9b.

Each of the connecting conductors 9b is formed by bending a rectangular copper wire along a circular arc. Disposed on each of the connecting conductors 9b are a coil connecting portion 9d that is connected to the coils 7 by soldering, etc.; and an inverter connecting portion 9a that is connected to the inverter portion 2. The connecting conductor supporting holder 9c is made of an insulating material such as plastic, etc., and is fixed to the stator core 6 using an adhesive, etc. A plurality of apertures 9e that allow passage of the coil connecting portions 9d are disposed on the connecting conductor supporting holder 9c. The apertures 9e are disposed on a circumference of a common circle so as to be spaced apart from each other circumferentially.

The inverter connecting portions 9a are disposed so as to be spaced apart from each other circumferentially around the end portion connecting member 9. Each of the inverter connecting portions 9a protrudes toward the output shaft of the motor portion 1 from an opposite axial end portion of the end portion connecting member 9 from the stator core 6.

Figure 4:
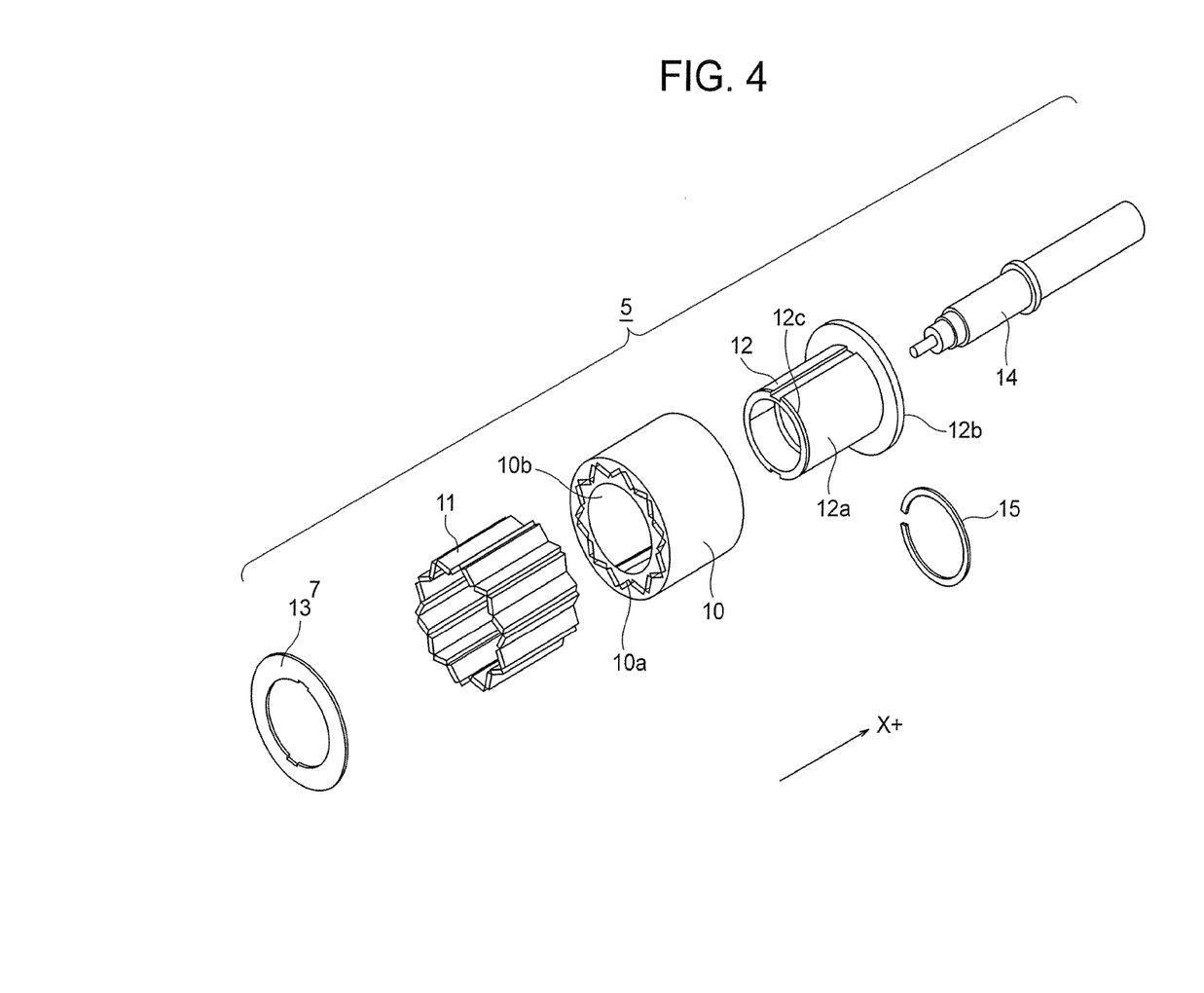
FIG. 4 is an exploded oblique projection that shows a rotor from FIG. 1.

FIG. 4 is an exploded oblique projection that shows the rotor 5 from FIG. 1. The rotor 5 has: a cylindrical rotor core 10; a plurality of (in this example, twenty) magnets 11; a cylindrical shaft supporting member 12; a hollow discoidal cover 13; a rotating shaft 14; and a C-shaped retaining ring 15.

The rotor core 10 is configured by laminating a plurality of electromagnetic steel sheets. A penetrating aperture 10b is disposed centrally on the rotor core 10. A cross-sectional shape of the penetrating aperture 10b is a circular shape that is concentric to an outer circumference of the rotor core 10.

Magnet insertion apertures 10a that have a rectangular cross section are disposed in a vicinity of the outer circumference of the rotor core 10. These magnet insertion apertures 10a are disposed in a star shape such that peaks and valleys line up alternately circumferentially around the rotor core 10 when viewed parallel to an axial direction of the rotor core 10. Each of the magnet insertion apertures 10a passes axially through the rotor core 10. Each of the magnets 11 has a flat plate shape that has a rectangular cross section, and is inserted into a corresponding magnet insertion aperture 10a.

The shaft supporting member 12 has: a cylindrical portion 12a; and a flange portion 12b that is formed on the first axial end portion of the cylindrical portion 12a. The cylindrical portion 12a is inserted into the penetrating aperture 10b of the rotor core 10. The flange portion 12b comes into contact with a first axial end surface of the rotor core 10.

The cover 13 comes into contact with a second axial end surface of the rotor core 10. A second axial end portion of the cylindrical portion 12a passes through the cover 13. A retaining ring mounting groove 12c to which the retaining ring 15 is mounted is disposed on the second axial end portion of the cylindrical portion 12a. The shaft supporting member 12 and the cover 13 are fixed to the rotor core 10 by mounting the retaining ring 15 into the retaining ring mounting groove 12c, preventing dislodging of the magnets 11 from the magnet insertion apertures 10a.

The rotating shaft 14 is fixed by being press-fitted centrally into the shaft supporting member 12. Bearings (not shown) are respectively press-fitted onto the end of the rotating shaft 14 near the output shaft (the X+ end) and onto an end away from the output shaft (an X− end). The rotor 5 is inserted inside the stator 4, and rotates around the rotating shaft 14 relative to the stator 4.

Figure 5:
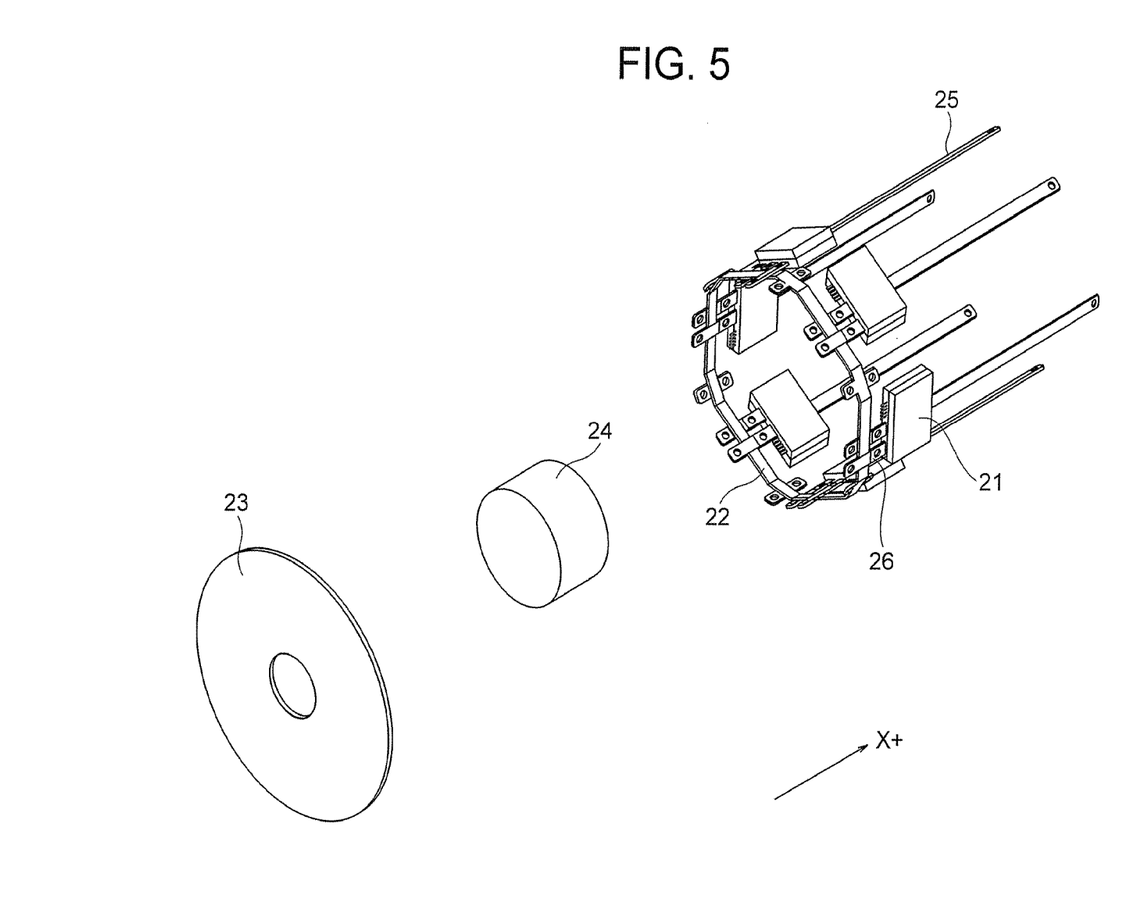
FIG. 5 is an exploded oblique projection that shows an inverter portion from FIG. 1.

FIG. 5 is an exploded oblique projection that shows the inverter portion 2 from FIG. 1. The inverter portion 2 has a plurality of (in this example, six) switching elements 21, a direct-current (DC) busbar 22, a hollow discoidal inverter controlling circuit board 23, and a snubber capacitor 24.

A single alternating-current (AC) output terminal 25, and two direct-current (DC) input terminals 26, which constitute an axial connector (a first connector), are connected to each of the switching elements 21. The AC output terminals 25 protrude from the switching elements 21 toward the motor portion 1, in other words, toward the output shaft (toward the X+ end). The AC output terminals 25 have a flat plate shape.

The DC input terminals 26 protrude from the switching elements 21 toward an opposite end from the motor portion 1, in other words, away from the output shaft (toward the X− end). The DC input terminals 26 are connected to a DC busbar 22. In addition, electric power is supplied to the DC input terminals 26 from a battery (not shown).

The snubber capacitor 24 is connected in parallel to the DC busbar 22, and is configured so as to suppress abrupt voltage fluctuations from the battery. The inverter controlling circuit board 23 is configured so as to be able to operate the inverter portion 2 appropriately based on operating commands from outside.

Figure 6:
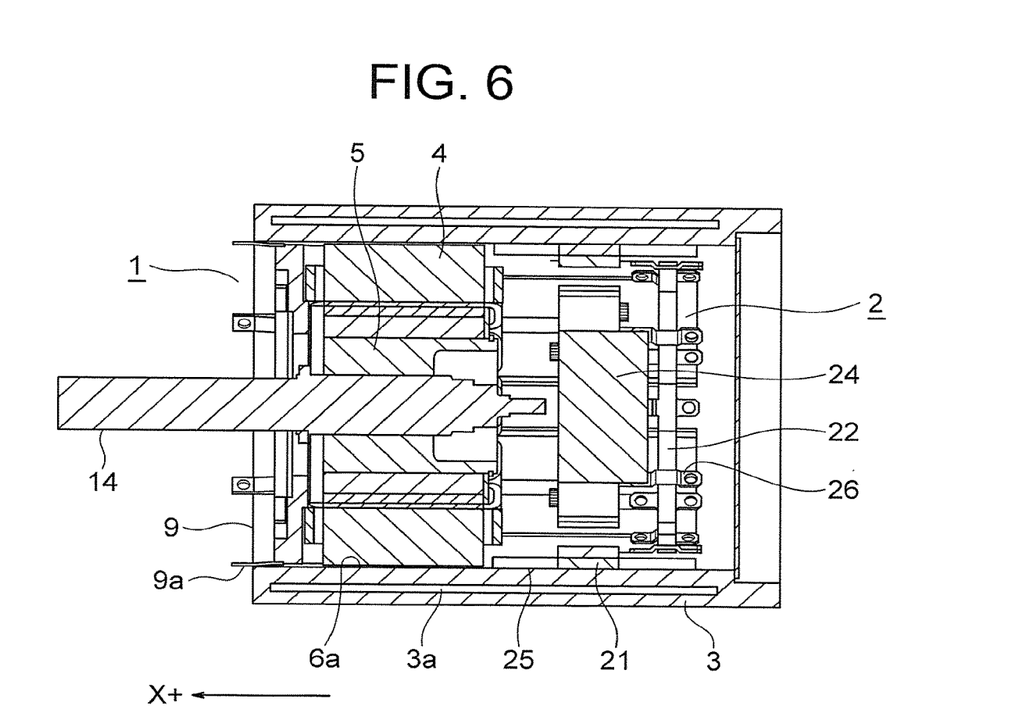
FIG. 6 is a cross section that is taken parallel to a shaft axis that shows an assembled state of the mechanically and electrically integrated rotary electric machine from FIG. 1.

FIG. 6 is a cross section that is taken parallel to a shaft axis that shows an assembled state of the mechanically and electrically integrated rotary electric machine from FIG. 1. FIG. 6 is in reverse to FIG. 1 in that the left side is the end of the motor portion 1 near the output shaft (the X+ end). Coolant flow channels 3a are disposed inside a wall portion of the cylindrical frame 3. The wall portion of the cylindrical frame 3 is cooled by passing a coolant such as cooling water, for example, through the coolant flow channels 3a.

Because the switching elements 21 perform ON/OFF switching of large electric currents, it is necessary to suppress temperature increases during operation. Because of that, the switching elements 21 are disposed so as to be in close contact with an inner circumferential surface (a cooling surface) of the cylindrical frame 3, and are constantly cooled by the coolant inside the coolant flow channels 3a.

The stator 4 is fixed inside the cylindrical frame 3 by shrinkage fitting, etc. The AC output terminals 25 are disposed so as to pass from the switching elements 21 through a mounted region of the motor portion 1 parallel to the axial direction of the cylindrical frame 3.

Each of the AC output terminals 25 is inserted into a corresponding stator groove 6a around the outer circumference of the stator 4. A conduit member 8 is interposed between each of the AC output terminals 25 and the inner wall surfaces of the stator grooves 6a. Finally, each of the AC output terminals 25 is connected to a corresponding inverter connecting portion 9a by an end portion near the output shaft of the motor portion 1.

In a connected state of this kind, the AC output terminals 25 direct the sinusoidal electric currents from the switching elements 21 to the end portion connecting member 9. Then the end portion connecting member 9 distributes the sinusoidal electric currents from the switching elements 21 to the respective coils 7.

Next, a method for connecting the end portion connecting member 9 and the AC output terminals 25 in particular will be explained using FIG. 6. The switching elements 21 are individually affixed to the inner wall surface (the cooling surface) of the cylindrical frame 3 when the stator 4 is fixed. Here, the conduit members 8 are inserted into the stator grooves 6a in advance, and the AC output terminals 25 are placed alongside the inner wall surface of the cylindrical frame 3 while being inserted into the stator grooves 6a.

The AC output terminals 25 are connected electrically to the end portion connecting member 9 by stacking tip end portions of the AC output terminals 25 together with the inverter connecting portions 9a of the end portion connecting member 9 and fastening together aperture portions of the two using screws. The sinusoidal electric currents can thereby be supplied to the motor portion 1.

The AC output terminals 25 and the conduit members 8 are also subsequently fixed to the cylindrical frame 3 by filling the stator grooves 6a with a molding agent (not shown). Electrical insulation between the AC output terminals 25 and the cylindrical frame 3 can thereby be ensured, and heat generated due to the passage of electric current can be transferred to the inner wall surface of the cylindrical frame 3.

In a mechanically and electrically integrated rotary electric machine of this kind, because the end portion connecting member 9 is disposed on the end portion of the motor portion 1 near the output shaft (the load end), and the AC output terminals 25 are disposed so as to pass from the switching elements 21 through the mounted region of the motor portion 1 parallel to the axial direction of the cylindrical frame 3, the AC output terminals 25 can be efficiently disposed using the mounted region of the motor portion 1 without reducing the mounted volume of the inverter portion 2, enabling AC output terminals 25 that have large cross-sectional areas that can accommodate high output to be used while suppressing overall size increases.

Connection between the AC output terminals 25 and the end portion connecting member 9 can be performed in a shallower portion of the cylindrical frame 3 (a portion closer to the first axial end portion), enabling ease of assembly to be improved.

In addition, because the switching elements 21 can be mounted to the cylindrical frame 3 separately, ease of assembly can also be improved thereby.

Furthermore, by setting a width of the conduit members 8 slightly wider than a width of the AC output terminals 25, the AC output terminals 25 can be inserted smoothly inside the conduit members 8.

The AC output terminals 25 are prevented from contacting the stator core 6 by the conduit members 8, enabling insulation from the stator core 6 to be ensured.

In addition, by fitting the conduit members 8 into the stator grooves 6a in advance, catching when the AC output terminals 25 are inserted can be suppressed, enabling deformation of the AC output terminals 25 to be prevented.

Now, because the AC output terminals 25 according to Embodiment 1 are disposed so as to pass axially through the mounted region of the motor portion 1, longitudinal dimensions are increased. Because of that, the AC output terminals 25 may be deformed significantly due to resonance with vibration from a moving vehicle body, or vibration of the motor portion 1, and there is a risk that the switching elements 21 may be damaged.

In answer to that, in the configuration according to Embodiment 1, the amount of deformation in the AC output terminals 25 is suppressed by setting the second moment of area of the AC output terminals 25 so as to be low, and inserting the AC output terminals 25 into stator grooves 6a that are disposed on an outer circumferential portion of the stator core 6. Consequently, stresses that arise in end portions of the AC output terminals 25 due to deformation can be reduced, enabling deformation of the AC output terminals 25 due to vibration and damage to the switching elements 21 to be prevented.

When generating sine waves using the inverter, an electrification controlling method that is commonly used is "pulse-width modulation (PWM)", in which the amount of electric current that is passed is prescribed by changing spacing between switching. However, in that method, high-frequency noise that is synchronous with the switching is emitted by the AC output terminals, and there is a risk that the inverter may malfunction due to that noise.

In answer to that, in the configuration according to Embodiment 1, because the AC output terminals 25 do not pass through in a vicinity of the inverter portion 2 (away from the output shaft), but instead pass through in a vicinity of the motor portion 1 (near the output shaft), the influence of radiated noise is reduced, enabling malfunctioning of the inverter portion 2 to be suppressed, thereby enabling high reliability to be ensured during operation.

Because the AC output terminals 25 pass through the mounted region of the motor portion 1, longitudinal dimensions of the AC output terminals 25 are increased, enabling the inductance of the AC output terminals 25 to be increased. Responsiveness to the electric current due to voltage fluctuations in high-frequency waves can thereby be smoothed (antenna sensitivity to radiated noise can be reduced), enabling the occurrence of high-frequency noise to be suppressed.

In addition, because the stator grooves 6a are disposed at positions on the outer circumferential portion of the core back that face the tooth portions, i.e., positions at which the magnetic flux is relatively sparse, the AC output terminals 25 can be led to the output shaft end while minimizing effects on motor performance.

Furthermore, because the inverter connecting portions 9a protrude toward the output shaft end from the end portion connecting member 9, connection between the AC output terminals 25 and the end portion connecting member 9 can be performed at even shallower positions in the cylindrical frame 3, or outside the cylindrical frame 3, enabling ease of assembly to be further improved.

Moreover, in Embodiment 1, open portions of the conduit members 8 are disposed so as to face toward the cylindrical frame 3, but may be disposed in a reverse direction. In other words, if the cross-sectional shape of the apertures that are formed by the stator grooves 6a and the inner circumferential surface of the cylindrical frame 3 is a quadrangular shape, then conduit members that surround three sides of the cross section may be used, and the remaining side may be sealed using a molded resin.

The cross-sectional shape of the conduit members is not limited to an open box shape. It may be a hollow quadrangular shape (a closed box shape), for example. Pairs of conduit members that have L-shaped cross sections may be used in combination with each other. In addition, three or four flat conduit members may be used in combination with each other.

The cross-sectional shape of the apertures that are formed between the stator grooves 6a and the inner circumferential surface of the cylindrical frame 3 is also not limited to a quadrangular shape, and may be a circular shape or an oval shape, for example.

Furthermore, in Embodiment 1, flat AC output terminals 25 are used, but are not limited to this, and may be constituted by stranded wires, for example. In that case, rigidity of the AC output terminals is kept low, and the amount of deformation in the AC output terminals can also be suppressed, enabling stresses that are generated in the roots of the AC output terminals to be suppressed, and enabling damage due to vibration to be prevented.

Embodiment 2

Figure 7:
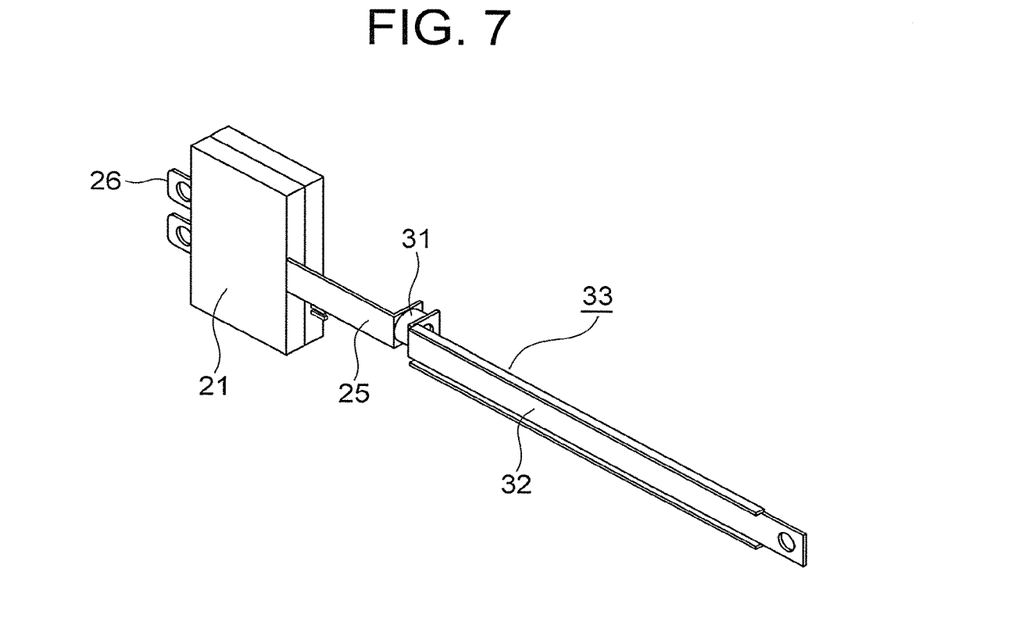
FIG. 7 is an oblique projection that shows a switching element of a mechanically and electrically integrated rotary electric machine according to Embodiment 2 of the present invention.

Next, FIG. 7 is an oblique projection that shows a switching element of a mechanically and electrically integrated rotary electric machine according to Embodiment 2 of the present invention. Longitudinal dimensions of AC output terminals 25 according to Embodiment 2 are smaller than the longitudinal dimensions of the AC output terminals 25 according to Embodiment 1. Furthermore, a tip end portion of the AC output terminal 25 according to Embodiment 2 is folded so as to be bent perpendicularly.

An electroconductive axial connecting member 32 is connected to the tip end portion of the AC output terminal 25 by means of an electroconductive buffering member 31. An axial connector 33 according to Embodiment 2 is constituted by the AC output terminal 25, the buffering member 31, and the axial connecting member 32.

An end portion of the axial connecting member 32 that is near the AC output terminal 25 is folded so as to be bent perpendicularly. Respective apertures for screw fastening are disposed on the tip end portion of the AC output terminal 25, and on the end portion of the axial connecting member 32 that is near the AC output terminal 25, respectively. The buffering member 31 is interposed between the tip end portion of the AC output terminal 25 and the end portion of the axial connecting member 32 that is near the AC output terminal 25, and is fastened by a screw.

Two sides in a width direction of an intermediate portion (a portion other than the two end portions) of the axial connecting member 32 are folded so as to be bent perpendicularly. In other words, the cross-sectional shape of the intermediate portion of the axial connecting member 32 is an open box shape.

The axial connecting member 32 is inserted into a stator groove 6a, and is disposed so as to pass through a mounted region of the motor portion 1 parallel to the axial direction of the cylindrical frame 3. An end portion of the axial connecting member 32 at an opposite end from the AC output terminal 25 is electrically connected to an inverter connecting portion 9a of an end portion connecting member 9 by being fastened by a screw.

Only one switching element 21 is depicted in FIG. 7, but connecting constructions between other switching elements 21 and the end portion connecting member 9 are similar or identical. The rest of the configuration of the rotary electric machine is similar or identical to that of Embodiment 1.

In a mechanically and electrically integrated rotary electric machine of this kind, because connection between the switching elements 21 and the end portion connecting member 9 is divided between the AC output terminals 25 and the axial connecting members 32, and the buffering members 31 are interposed between the two, vibration that propagates from the axial connecting members 32 to the AC output terminals 25 can be suppressed, enabling anti-vibration performance to be improved, thereby enabling damage to the switching elements 21 due to vibration to be more reliably prevented.

Because the axial connecting members 32 are inserted into the stator grooves 6a, deformation of the axial connecting members 32 due to vibration is suppressed.

In addition, because the cross-sectional shape of the intermediate portions of the axial connecting members 32 is an open box shape, the second moment of area of the axial connecting members 32 can be increased. Bending and twisting rigidity of the axial connecting members 32 against external vibration can thereby be improved. The resonant frequency of the construction is also raised, enabling resonance fractures to be suppressed.

Moreover, in Embodiment 2, the cross-sectional shape of the axial connecting members 32 was an open box shape, but may be an L shape or a hollow quadrangular shape, for example, and the second moment of area can be increased if it is a shape that has a cross section that is constituted by at least two arms.

Embodiment 3

Figure 8:
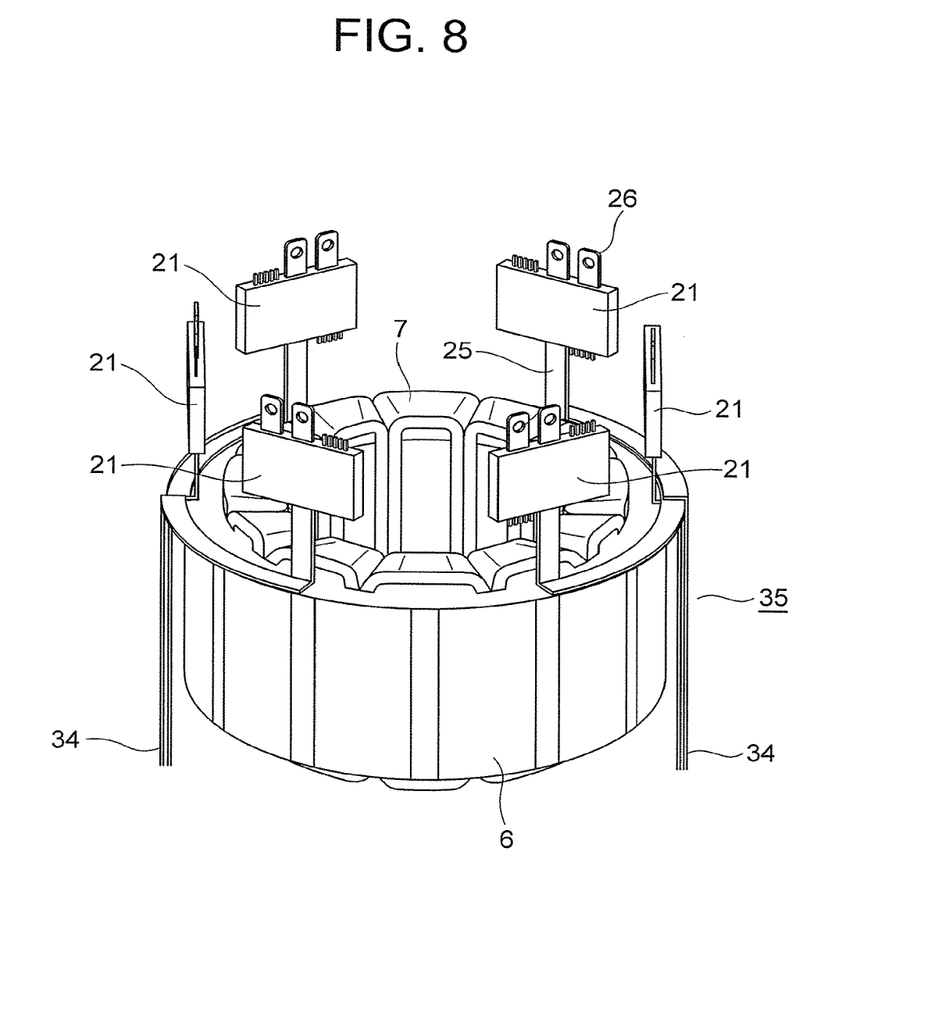
FIG. 8 is an oblique projection that shows a stator and switching elements of a mechanically and electrically integrated rotary electric machine according to Embodiment 3 of the present invention.
Figure 9:
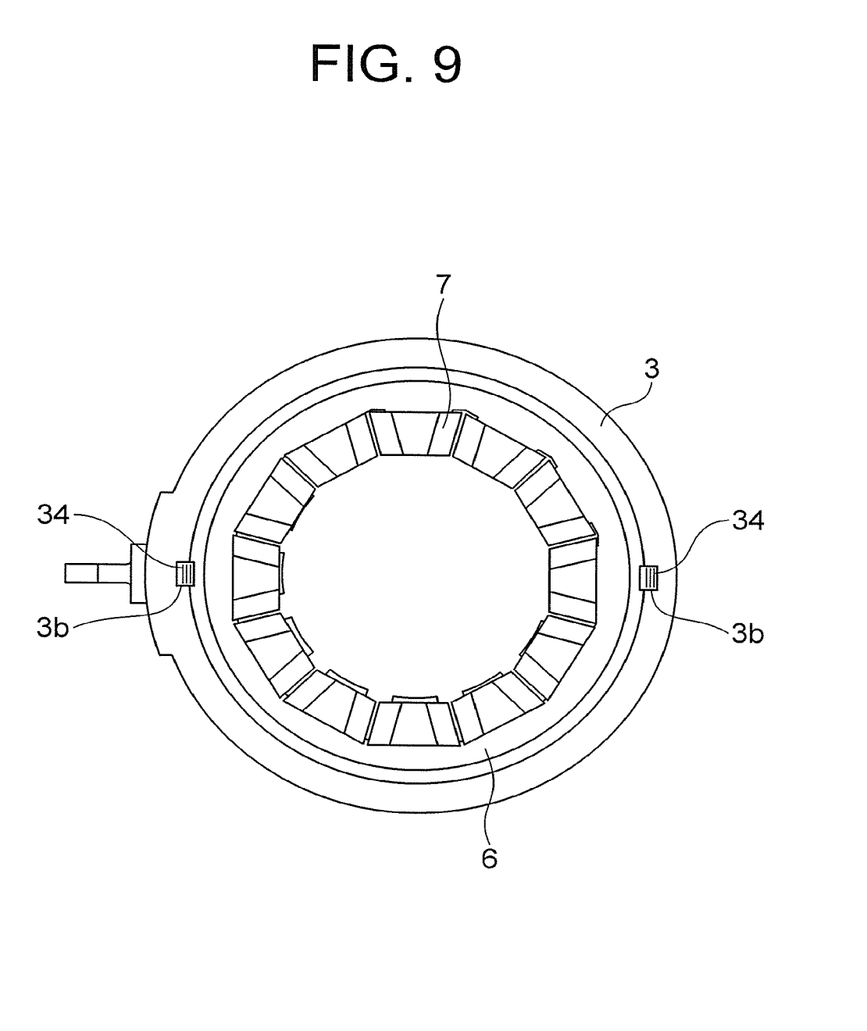
FIG. 9 is a front elevation that shows the stator and a cylindrical frame of the mechanically and electrically integrated rotary electric machine according to Embodiment 3 when viewed axially.

Next, FIG. 8 is an oblique projection that shows a stator 4 and switching elements 21 of a mechanically and electrically integrated rotary electric machine according to Embodiment 3 of the present invention, and FIG. 9 is a front elevation that shows a stator 4 and a cylindrical frame 3 of the mechanically and electrically integrated rotary electric machine according to Embodiment 3 when viewed axially.

In Embodiment 3, a plurality of (in this case, a pair of) frame grooves 3b are disposed on an inner circumferential surface of a cylindrical frame 3. The frame grooves 3b are disposed so as to be adjacent to coolant flow channels 3a so as to be spaced apart from the coolant flow channels 3a in a radial direction of the cylindrical frame 3. The frame grooves 3b are disposed so as to be spaced apart from each other circumferentially around the cylindrical frame 3 (in this example, by 180 degrees).

In addition, the frame grooves 3b are disposed so as to be parallel to an axial direction of the cylindrical frame 3. Furthermore, the frame grooves 3b are disposed at positions that face tooth portions, i.e., at positions in a circumferential direction of the cylindrical frame 3 that are similar or identical to those of the tooth portions.

Axial connecting members 34 are inserted into the frame grooves 3b in groups of three. In this example, a motor that has two three-phase (U, V, and W) connections is presumed, and three axial connecting members 34 that are respectively connected to three (U, V, and W) AC output terminals 25 of the switching elements 21 are inserted into a shared frame groove 3b.

The axial connecting members 34 are flat copper bars that have a rectangular cross section. The axial connecting members 34 that are inserted into the shared frame grooves 3b are stacked in a thickness direction after an insulating coating has been applied to an outer circumference thereof.

An axial connector 35 according to Embodiment 3 is constituted by the AC output terminal 25 and the axial connecting member 34. The rest of the configuration is similar or identical to that of Embodiments 1 or 2.

In a mechanically and electrically integrated rotary electric machine of this kind, because the axial connecting members 34 are inserted into the frame grooves 3b that are disposed on the cylindrical frame 3, stator grooves 6a on the stator core 6 can be omitted (or kept to a minimum), enabling effects on motor performance to be further reduced.

Because two or more axial connectors 35 are gathered together in the mounted region of the inverter portion 2, and are disposed at identical positions in the circumferential direction of the motor portion 1, wiring can be passed through utilizing space efficiently and compactly. In addition, the overall area of portions for passage of the axial connector 35 is reduced, and machined positions on the cylindrical frame 3 and the stator core 6 can be minimized.

Furthermore, because the frame grooves 3b are disposed so as to be adjacent to the coolant flow channels 3a in the cylindrical frame 3, the axial connecting members 34 can be cooled more efficiently.

Moreover, in Embodiment 3, the three axial connecting members 34 are disposed so as to be stacked, but three axial connecting members (three phases) may be twisted and then inserted into the penetrating aperture (a twisted wire construction). In that case, noise emitted by the AC wiring can be suppressed.

Six frame grooves 3b may be disposed on the inner circumferential surface of the cylindrical frame 3, and individual axial connecting members 34, axial connecting members 32 according to Embodiment 2, or AC output terminals 25 according to Embodiment 1 may be inserted into the respective frame grooves 3b.

In addition, in Embodiment 3, groups of three axial connecting members 34 are gathered together, but the elements gathered together are not limited to a particular number. They may be gathered together in groups of two, or all six may be gathered together at a single position, for example.

Furthermore, the buffering members 31 that are shown in Embodiment 2 may be interposed between the axial connecting members 34 and the AC output terminals 25 according to Embodiment 3.

Embodiment 4

Figure 10:
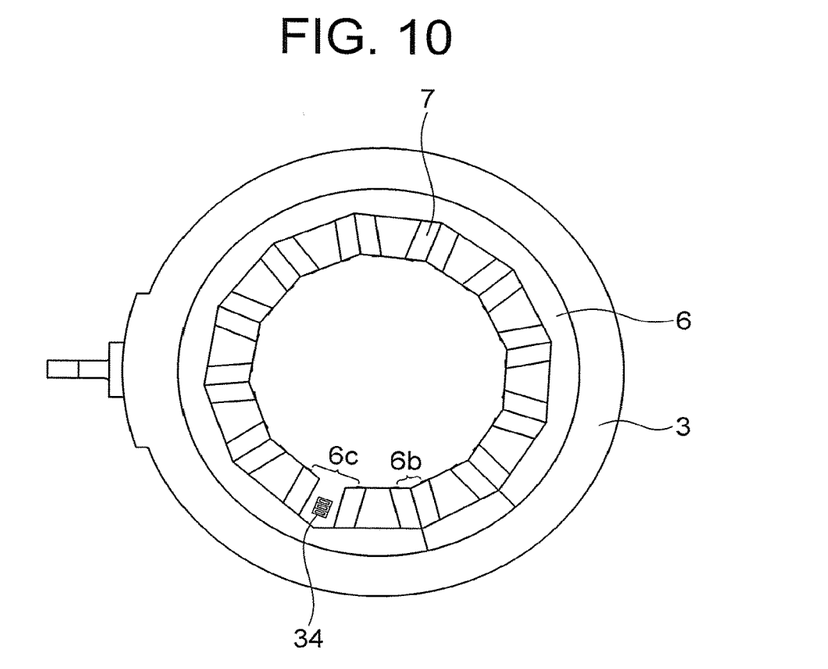
FIG. 10 is a front elevation that shows a stator and a cylindrical frame of a mechanically and electrically integrated rotary electric machine according to Embodiment 4 of the present invention when viewed axially.

Next, FIG. 10 is a front elevation that shows a stator 4 and a cylindrical frame 3 of the mechanically and electrically integrated rotary electric machine according to Embodiment 4 of the present invention when viewed axially. In Embodiment 4, six axial connecting members 34 that are similar or identical to those of Embodiment 3 are gathered together, and are passed through a slot portion of a stator core 6.

The slot portions of the stator core 6 according to Embodiment 4 includes: a plurality of normal slot portions 6b; and a widened slot portion 6c that has a larger width dimension than the normal slot portions 6b. The widened slot portion 6c is formed by making the pitch of the tooth portions in a circumferential direction of the stator core 6 partially nonuniform.

A bundle of axial connecting members 34 passes through the widened slot portion 6c. More specifically, the bundle of axial connecting members 34 is passed through a gap that is formed between coils 7 that are wound onto the tooth portions on two sides of the widened slot portion 6c. The rest of the configuration is similar or identical to that of Embodiments 1, 2 or 3.

In a mechanically and electrically integrated rotary electric machine of this kind, because the axial connecting members 34 can be passed through to the output shaft end without disposing grooves on the stator core 6, effects on magnetic characteristics of the motor can be kept to a minimum.

Moreover, in Embodiment 4, the widened slot portion 6c is disposed at a single position in the circumferential direction of the stator core 6, but may be disposed at two or more positions, and the axial connecting members 34, the axial connecting members 32 according to Embodiment 2, or the AC output terminals 25 according to Embodiment 1, inserted into each.

If two or more axial connecting members 34 are gathered together, they may be stacked in a thickness direction, or they may have a twisted wire construction.

Embodiment 5

Figure 11:
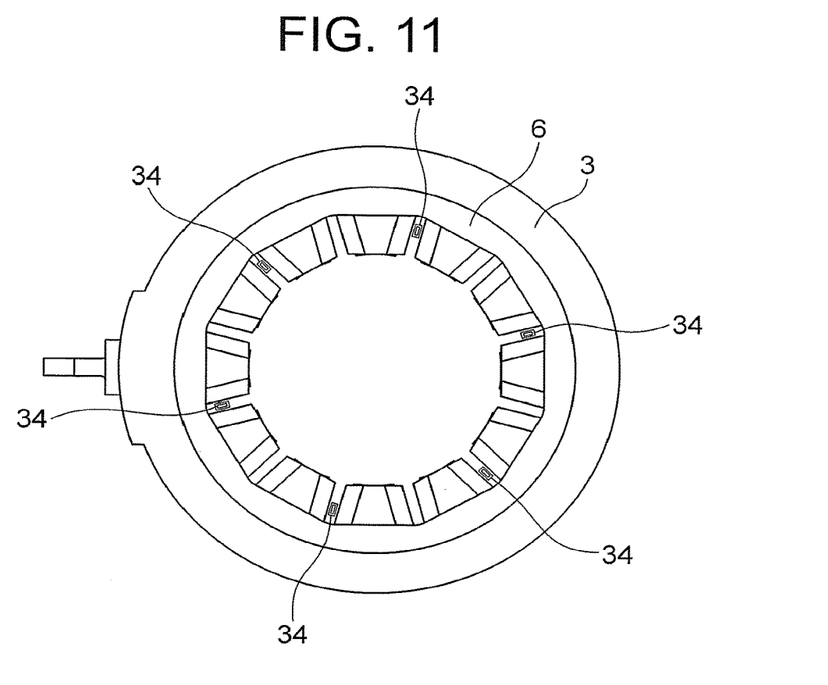
FIG. 11 is a front elevation that shows a stator and a cylindrical frame of a mechanically and electrically integrated rotary electric machine according to Embodiment 5 of the present invention when viewed axially.

Next, FIG. 11 is a front elevation that shows a stator 4 and a cylindrical frame 3 of the mechanically and electrically integrated rotary electric machine according to Embodiment 5 of the present invention when viewed axially. In Embodiment 5, although width dimensions of slot portions of a stator core 6 are all uniform, respective gaps are formed in slot portions between adjacent coils 7 by reducing an external shape of the coils 7. Axial connecting members 34 are passed through six gaps among those gaps. The rest of the configuration is similar or identical to that of Embodiments 1, 2 or 3.

In a mechanically and electrically integrated rotary electric machine of this kind, because the axial connecting members 34 can also be passed through to the output shaft end without disposing grooves on the stator core 6, effects on magnetic characteristics of the motor can be kept to a minimum.

Moreover, in Embodiment 5, six axial connecting members 34 were disposed at different circumferential positions on the stator core 6, but two or more may be disposed so as to be gathered together. In that case, the axial connecting members 32 may be stacked in a thickness direction, or they may have a twisted wire construction.

The invention claimed is:

1. A mechanically and electrically integrated rotary electric machine comprising:
   a cylindrical frame;
   a motor portion comprising:
      a cylindrical stator core;
      a plurality of coils that are disposed around an inner circumference of the stator core; and
      a rotor that is rotatably disposed inside the stator core,
   the motor portion being inserted inside the frame;
   an inverter portion comprising a plurality of switching elements, the inverter portion being fixed to an inner circumferential surface of the frame; and
   a connector that electrically connects the coils and the switching elements,
   wherein the connector comprises:
   an end portion connector that is disposed on an end portion of the motor portion near an output shaft, and that distributes sinusoidal electric currents from the switching elements to each of the coils; and
   a plurality of axial connectors that are disposed so as to pass from the switching elements through a mounted region of the motor portion parallel to an axial direction of the frame, the axial connectors directing the sinusoidal electric currents from the switching elements to the end portion connector.

2. The mechanically and electrically integrated rotary electric machine according to claim 1, wherein:
   a plurality of tooth portions that protrude radially inward are disposed around the inner circumference of the stator core;
   a plurality of stator grooves are disposed parallel to an axial direction of the stator core around an outer circumference of the stator core;
   the stator grooves are disposed at identical positions to the tooth portions in a circumferential direction of the stator core; and
   the axial connectors are inserted into the stator grooves.

3. The mechanically and electrically integrated rotary electric machine according to claim 2, wherein a surface at a tip end portion of the axial connector on which a first aperture portion is formed and a surface of the end portion connector on which a second aperture portion is formed are stacked and fastened by a screw.

4. The mechanically and electrically integrated rotary electric machine according to claim 1, wherein:
   a plurality of frame grooves are disposed parallel to the axial direction of the frame around an inner circumference of the frame; and
   the axial connectors are inserted into the frame grooves.

5. The mechanically and electrically integrated rotary electric machine according to claim 4, wherein:
   a coolant flow channel is disposed inside a wall portion of the frame; and
   the frame grooves are disposed so as to be adjacent to the coolant flow channel.

6. The mechanically and electrically integrated rotary electric machine according to claim 1, wherein:
   a plurality of tooth portions that protrude radially inward are disposed around the inner circumference of the stator core;
   slot portions are respectively formed between adjacent tooth portions; and
   the axial connectors pass through the slot portions.

7. The mechanically and electrically integrated rotary electric machine according to claim 6, wherein:
   the slot portions include:
      a plurality of normal slot portions; and
      a widened slot portion that has a larger width dimension than the normal slot portions; and
   the axial connectors pass through the widened slot portion.

8. The mechanically and electrically integrated rotary electric machine according to claim 1, wherein two or more of the axial connectors are gathered together in a mounted region of the inverter portion, and are disposed at an identical position in a circumferential direction of the motor portion.

9. The mechanically and electrically integrated rotary electric machine according to claim 8, wherein the axial connectors are gathered together in groups of three phases and are twisted together with each other.

10. The mechanically and electrically integrated rotary electric machine according to claim 1, wherein the axial connector has a shape that has a cross section that is constituted by at least two arms.

11. The mechanically and electrically integrated rotary electric machine according to claim 1, wherein:
   the axial connectors comprise:
      an alternating-current output terminal that is connected to the switching elements;
      an electroconductive buffering member; and
      an axial connecting member; and the axial connecting member is connected to the alternating-current output terminal such that the buffering member is interposed.

12. The mechanically and electrically integrated rotary electric machine according to claim 1, wherein:
   a plurality of tooth portions that protrude radially inward are disposed around the inner circumference of the stator core;
   a plurality of stator grooves are disposed parallel to an axial direction of the stator core around an outer circumference of the stator core;
   the stator grooves are disposed at similar or identical positions to the tooth portions in a circumferential direction of the stator core;
   the axial connectors are inserted into the stator grooves; and
   conduit members that are made of an insulating material are interposed between the axial connectors and inner wall surfaces of the stator grooves.

13. A manufacturing method for a mechanically and electrically integrated rotary electric machine comprising:
   a cylindrical frame;
   a motor portion comprising:
      a cylindrical stator core;
      a plurality of coils that are disposed around an inner circumference of the stator core; and
      a rotor that is rotatably disposed inside the stator core, the motor portion being inserted inside the frame;
   an inverter portion comprising a plurality of switching elements, the inverter portion being fixed to an inner circumferential surface of the frame; and
   a connector that electrically connects the coils and the switching elements,
   wherein the connector comprises:
      an end portion connector that is disposed on an end portion of the motor portion near an output shaft, and that distributes sinusoidal electric currents from the switching elements to each of the coils; and
      a plurality of axial connectors that comprise alternating-current output terminals that are connected to the switching elements, the axial connectors directing the sinusoidal electric currents from the switching elements to the end portion connector,
   the manufacturing method comprising:
      a first step in which the stator core is fixed to the frame;
      a second step, after the first step, in which the alternating-current output terminals are inserted into a plurality of stator grooves that are disposed parallel to an axial direction of the stator core around an outer circumference of the stator core; and
      a third step, after the second step, in which the switching elements are affixed to an inner circumferential surface of the frame.

14. The manufacturing method according to claim 13, further comprising a fourth step, after the third step, in which a surface at a tip end portion of the axial connector on which a first aperture portion is formed and a surface of the end portion connector on which a second aperture portion is formed are stacked and fastened by a screw.

* * * * *